(12) United States Patent
Monteiro De Barros (10) Patent No.: US 10,875,359 B2
(45) Date of Patent: Dec. 29, 2020

(54) ROLLING DEVICE, ESPECIALLY FOR FURNITURE, LUGGAGE CASES AND THE LIKE

(71) Applicant: Romualdo Monteiro De Barros, Rio de Janeiro (BR)

(72) Inventor: Romualdo Monteiro De Barros, Rio de Janeiro (BR)

(*) Notice: Subject to any disclaimer, the term of this patent is extended or adjusted under 35 U.S.C. 154(b) by 0 days.

(21) Appl. No.: 15/918,993

(22) Filed: Mar. 12, 2018

(65) Prior Publication Data

US 2018/0201064 A1    Jul. 19, 2018

Related U.S. Application Data

(63) Continuation-in-part of application No. 15/186,699, filed on Jun. 20, 2016, now abandoned.

(51) Int. Cl.
| | |
|---|---|
| *B60B 33/08* | (2006.01) |
| *A45C 5/14* | (2006.01) |
| *B60B 19/00* | (2006.01) |
| *B60B 33/00* | (2006.01) |
| *B60B 35/18* | (2006.01) |
| *B60B 35/00* | (2006.01) |

(52) U.S. Cl.
CPC ............... *B60B 33/08* (2013.01); *A45C 5/14* (2013.01); *B60B 19/003* (2013.01); *B60B 33/0026* (2013.01); *A45C 2005/142* (2013.01); *B60B 33/0028* (2013.01); *B60B 35/009* (2013.01); *B60B 35/18* (2013.01); *B60B 2200/20* (2013.01); *B60B 2200/22* (2013.01); *B60B 2380/76* (2013.01)

(58) Field of Classification Search
CPC ............................ B60B 33/0028; B60B 33/08
See application file for complete search history.

(56) References Cited

U.S. PATENT DOCUMENTS

| | | | |
|---|---|---|---|
| 1,356,566 A * | 10/1920 | Smith | .................... B60B 33/08 |
| | | | 16/26 |
| 1,358,543 A | 11/1920 | Hardon | |
| 1,460,159 A | 6/1923 | Karpiej | |
| 2,133,826 A * | 10/1938 | Milich | ................ B60B 33/0028 |
| | | | 16/20 |
| 2,182,445 A | 12/1939 | Milich | |
| 2,690,584 A | 10/1954 | Freddolino | |

(Continued)

OTHER PUBLICATIONS

Non-Final Office Action dated Jun. 11, 2019 in copending U.S. Appl. No. 15/918,173.

*Primary Examiner* — Victor D Batson
*Assistant Examiner* — Matthew J Sullivan
(74) *Attorney, Agent, or Firm* — Duane Morris LLP; Thomas J. Kowalski; Heidi E. Lunasin (57) ABSTRACT

The present utility model refers to a rolling device and, more particularly, an improved multi-directional ball caster-type device having an increased slope, which means a smaller angular slope level, or a more acute inclination angle between the central vertical axis of the device and the surface upon which it rolls. The slope, or inclination angle of the present improved device is from 62° to 50°, or less. As the inclinations angle can be more acute, the object supported on the rolling system, e.g. a luggage case, can be more sloped without having friction between the main ball involving structure and the ground.

4 Claims, 7 Drawing Sheets

(56) References Cited

U.S. PATENT DOCUMENTS

| | | | | |
|---|---|---|---|---|
| 3,445,882 | A * | 5/1969 | Miano | B60B 33/0028 16/21 |
| 4,996,738 | A * | 3/1991 | Tifre | B60B 33/08 16/26 |
| 6,244,417 | B1 * | 6/2001 | Timmer | B60B 33/0002 193/35 MD |
| 7,578,028 | B2 * | 8/2009 | Sellars | B60B 33/08 16/20 |
| 9,783,001 | B1 * | 10/2017 | Panter | B60B 33/08 |
| 2005/0060840 | A1 * | 3/2005 | Polevoy | A47C 7/006 16/26 |
| 2006/0101614 | A1 | 5/2006 | Sellars | |
| 2006/0202548 | A1 * | 9/2006 | Chen | A63C 17/24 301/5.1 |
| 2006/0243497 | A1 | 11/2006 | Orenbuch | |
| 2009/0056070 | A1 * | 3/2009 | James | B60B 33/0002 16/45 |
| 2009/0293227 | A1 | 12/2009 | Wang | |
| 2018/0319216 | A1 * | 11/2018 | Cherian | B60B 33/08 |

* cited by examiner

ROLLING DEVICE, ESPECIALLY FOR FURNITURE, LUGGAGE CASES AND THE LIKE

RELATED APPLICATIONS AND INCORPORATION BY REFERENCE

This application is a continuation-in-part of U.S. patent application Ser. No, 15/186,699, filed Jun. 20, 2016. Reference is made to BR 102014012724 published 22 Dec. 2015 by the inventor and as such BR 102014012724 is not available as prior art under post-AIA 35 U.S.C, 102(a)(1), but is excluded from being available as prior art pursuant to post-AIA 35 U.S.C. 102(b)(1).

TECHNICAL FIELD

The present patent application refers to a rolling device and, more particularly, an improved multi-directional ball caster-type device. The utility model also relates to a method for manufacturing a rolling ball device, as well as a simple and safe method for assembling and installing a rolling ball device.

BACKGROUND OF THE UTILITY MODEL

Generally, rolling devices are widely used in furniture, such as chairs and tables, baby strollers or baby prams, supermarket trolleys, and toys, as well as in luggage cases, bags, backpacks and the like.

Examples of ball caster-type rolling devices can be found in documents of the prior art, such as, for instance, the device disclosed in the U.S. Pat. No. 1,358,543, in the name of F. H. Hardon, which discloses a rolling device comprising a main rolling ball, small bearing balls and a hosing. However, the rolling device described in such document requires too many pieces and, consequently, assembling steps, in order to be manufactured, the small bearing balls are positioned in sockets formed in the internal upper portion of the housing and in flanges which are attached to the lower part of the housing. The bearing balls are positioned below the center of the main rolling ball, but they are not provided in a ring, but in sockets formed in flanges, which have to be fixed, by screws or bolts, for example, to the lower portion of the housing in order to support the main rolling ball. The device disclosed herein does not require the use of flanges attached to the housing, since the lower ring, positioned below the center of the main rolling ball, is able to support the same alone, without the need of additional pieces, such as flanges, screws and bolts, and associated assembling steps. As a result of such improvements, the device disclosed in the present patent application is safer, cheaper and easier to manufacture.

The Chinese patent document CN 2,739,021, entitled "Vertical Universal Caster", filed in the name of Xu Haikang and published on Nov. 9, 2005 discloses a rolling device having a main rolling ball and two rings of secondary rolling balls, the rings have different diameters and they are enclosed by a two-part structural member. The upper structural member has two grooves to fit both rings. The device has also a supporting structure which is fixed to an object in which is to be installed. Furthermore, both ball rings are fitted to the same single upper structural member. Therefore, the device assembly is too complex and required too many pieces. Furthermore, the device disclosed in the above-mentioned patent document was designed to be externally attached to an object, so it may not be attached to an object internally, for example in a housing, chamber or opening formed in the object to which the device is to be attached, for example luggage cases, cases, suitcases and the like.

Another example of a prior art rolling device is disclosed in U.S. Pat. No. 7,578,028, entitled "Device for providing multi-directional movement", in the name of Robert Sellars, published on May 18, 2006 and granted on Aug. 25, 2009. The document U.S. Pat. No. 7,578,028 discloses a device for providing a multi-directional movement, comprising a two-part housing that encloses a main rolling ball and two rings of secondary rolling balls or ball rollers. The members of the device are stacked or screwed on top each other, and the secondary rolling balls are located in a recessed area defined by the inner walls of the housing. The device disclosed in U.S. Pat. No. 7,578,028 was designed for use in shopping trolleys and its main improvement is a breaking mechanism. The device design and the breaking mechanism are useless in many applications, such as in luggage cases, bags, backpacks and the like. Furthermore, the rolling device disclosed in U.S. Pat. No. 7,578,028 is liable to failure and locking during its use.

The housing of the device disclosed in the U.S. Pat. No. 7,578,028 is shaped in such a way that is not suitable to certain applications which require a more compact structure. The housing has an "inverted cup shape" structure, having a vertical shaft formed on its top and requires a skirting device to be screwed to the lower part of the housing in order to support the main rolling ball and the rings of rolling balls. On the other hand, the housing of the device disclosed in the present application is designed to be round in order to house the rolling ball and rings in the most space-efficient way, a shaft is not required in order to attach the device to an object, and the main rolling ball is supported by the lower ring of rolling balls, so a skirting device is not necessary for supporting the same, which makes the housing even more compact.

Finally, it should be noted that none of the above-mentioned prior art documents disclose a rolling device designed in order to allow a slope angle, or inclination angle, of the housing of less than 62°. The slope angle, or inclination angle is the angle between the central vertical axis of the device and the surface upon which it rolls. A smaller angular slope level, or more acute inclination angle of the device is desirable when the device is attached to an object which may be carried, or moved throughout a surface in a sloped, or inclined, position, for example, a luggage case, or a suitcase. In view of this, there is clearly a need for an improved rolling device which can be attached to objects which require smaller angular slope levels, or more acute inclination, for example an inclination of less than 62°. In view of these restrictions and/or disadvantages of the rolling devices in the state-of-the-art, a new rolling device has been designed in order to have a better and safer performance, easier and cheaper manufacturing, and allow smaller angular slope levels, or more acute inclination of the housing in relation to the surface upon which the ball caster-type rolls.

The device disclosed herein has a structural configuration that allows a considerable decrease of its size. For instance, it does not require the use of screws, bolts or the like, although those may be used in order to attach the device to an object, such as furniture, trolley, luggage case, or any other suitable object. Moreover, the housing is shaped round, having no corners, so it fits better to the shape of the rolling ball, and comprises grooves carved in its internal walls in order to receive the rings of bearing (or secondary) balls.

Furthermore, both rolling rings, which hold and support the larger main caster-type ball, were brought into a closer arrangement. In short, the lower ring of bearing (or secondary) balls surrounds the main rolling ball in a region below, but as near as possible to its center, in order to hold and support the main rolling ball within the housing, and, at the same time, increase the distance between the base of the structure and the ground, thereby optimizing the slope, or inclination angle there between. The upper ring of bearing (or secondary) balls of the device disclosed herein is also positioned nearer to the center of the main rolling ball, in order to enable an angular slope, or inclination angle of 62° or less.

More specifically, the utility model of the present utility model provides a slope, or inclination angle between the central vertical axis of the device (which is the same central vertical axis of the main rolling ball) and the ground less than 62°, preferably 50°, 45°, 40° or less. This feature allows the installation of the device in objects that require smaller angular slope levels, or more acute inclination, such as, for example, suitcases, luggage cases and the like.

Accordingly, the advantages of the utility model of the present utility model in relation to the state-of-the-art are accomplished by the optimization of the integral structure, and, in particular, by the novel position of the rings of rolling balls, which provides an increased slope between the central axis of the main ball (which is the central axis of the device) and the ground, or any surface. Such angular slope, or inclination angle, has been decreased from 62° to 50°, or less. As the angular slope level, or inclination angle, can be smaller, or more acute, the object supported on the rolling system can be more sloped, or inclined, without having friction between the main ball involving structure and the ground. Such improvement is especially useful for luggage cases, suitcases and the like, which may be conveniently inclined up to 62° to 50°, or less, whilst being carried.

BRIEF DESCRIPTION OF THE UTILITY MODEL

The present utility model refers to an improved multi-directional ball caster-type device, comprising a housing formed by a single member, or by lower and upper structural members, each one having at least one groove to receive rings of rolling balls, also called rolling rings, and a main rolling ball, also called main spherical roller, or ball caster, enclosed by the housing without the need of any other element, such as a skirting device or a flange, wherein the lower rolling rings surround the main rolling ball in a region below, but as near as possible to its center, in order to hold and support the main rolling ball within the housing, and, at the same time, optimizing the slope angle, or inclination angle, of the device. The above-mentioned groove is a continuous groove and the groove extends in a circumferential direction around at least one section of the main rolling ball. In this embodiment, the whole housing or at least one of the lower structural members and the upper structural member is a single piece.

In another embodiment, if the housing is formed by more than one piece, the structural members comprise attachment means in order to attach the lower structural member to the upper structural member, for example, and such attachment means may be screws or bolts, but may also be formed in or extend from the housing, or structural members, in order to allow these to fit in, hook or clamp to each other, for example, without the need of screws, bolts or the like.

The lower rolling ring has a greater diameter than the upper rolling ring, and the diameter of the lower rolling ring and the diameter of the upper rolling ring have a ratio between 1:1.1 and 1:2. The lower rolling ring forms a first geometrical plane and the upper rolling ring forms a second geometrical plane, wherein these planes are parallel with respect to each other and wherein a distance between these planes is smaller than the diameter of the main rolling ball, preferably smaller than 90% of the diameter of the main rolling ball, preferably smaller than 80% of the diameter of the main rolling ball, preferably smaller than 70% of the diameter of the main rolling ball. Preferably a distance between these planes is bigger than 10% of the diameter of the main rolling ball, preferably bigger than 20% of the diameter of the main rolling ball, preferably bigger than 30% of the diameter of the main rolling ball.

One purpose of the present utility model a multi-directional rolling ball device which enables an inner rolling of 360°, in all axes, thereby allowing a free displacement of the load supported by the device in all directions.

Another purpose of the device disclosed herein is providing a much more compact multi-directional rolling ball device, wherein the housing is formed by more than one piece, the structural members comprise attachment means in order to attach the lower structural member to the upper structural member, for example, and such attachment means may be screws or bolts, but preferably are formed in the structural members in order to allow these to fit in, hook or clamp to each other, for example, without the need of screws, bolts or the like.

Another purpose of the present utility model is to provide a multi-directional rolling ball device, which can be easily and safely assembled and that avoids failures and locking during use.

It is still another object of the present utility model to provide a multi-directional rolling ball device cheaper and easier to manufacture, which can be quickly assembled and that requires less parts or members.

According to one embodiment of the present utility model, the multi-directional rolling ball device supports loads with weights varying from 80 kg to 150 kg, depending on the intended use of the device, without causing failures or damages in the rolling system.

According to another embodiment of the present utility model, the distance between the surface and the base of the multi-directional rolling ball device is calculated so as to minimize the whole size of the device and so as to provide the normal angles for its applicability.

According to an optional embodiment of the present utility model, the multi-directional rolling ball device has an integrated safety system for braking and for fixing or holding the load to be supported. This safety means can be designed among other as a clamp system which prevents a rotation of the main ball with respect to the lower and upper structural members. Preferably at least on structural member forms a receiving space for the main rolling ball, suitable to house at least 40% of the volume of the main rolling ball, preferably at least 50% of the volume of the main rolling ball and most preferably at least 60% of the volume of the main rolling ball.

The purposes of the present utility model are attained by providing a multi-directional rolling ball device comprising a housing formed by a single piece or a lower; and upper structural members; a main rolling ball enclosed by a housing having at least two (lower and upper) grooves (or recessed areas) carved in its internal part; at least one ring of secondary rolling balls being fitted within the at least one lower groove; the at least one lower and one upper rings of secondary rolling balls fitted within their respective lower and upper grooves, wherein each one of the rings of secondary rolling balls is an enveloped set of secondary balls.

The purposes above mentioned are further attained by providing a method for installing the device disclosed herein to an object which may be carried on the same, such as furniture, electronics, boxes, cases, containers, luggage cases, suitcases and the like.

BRIEF DESCRIPTION OF THE DRAWINGS

The present utility model will be better understood by means of the description herein below, together with the appended Figures, wherein:

FIG. 8 is a front view of a possible embodiment of the multi-directional rolling ball device (1) after being assembled. FIG. 8 also shows the angular distance between the grooves (1.41, 1.51), of less than 50°.

FIG. 11 shows that an angular distance between the rings of secondary rolling balls may be less than 50°.

It must be understood that the multi-directional rolling ball device (1) of the present utility model and their respective parts shown in the appended Figures are only an example of one embodiment of the object herein claimed and it is not intended to limit the scope of protection of the utility model.

DETAILED DESCRIPTION OF THE UTILITY MODEL

Figure 1:
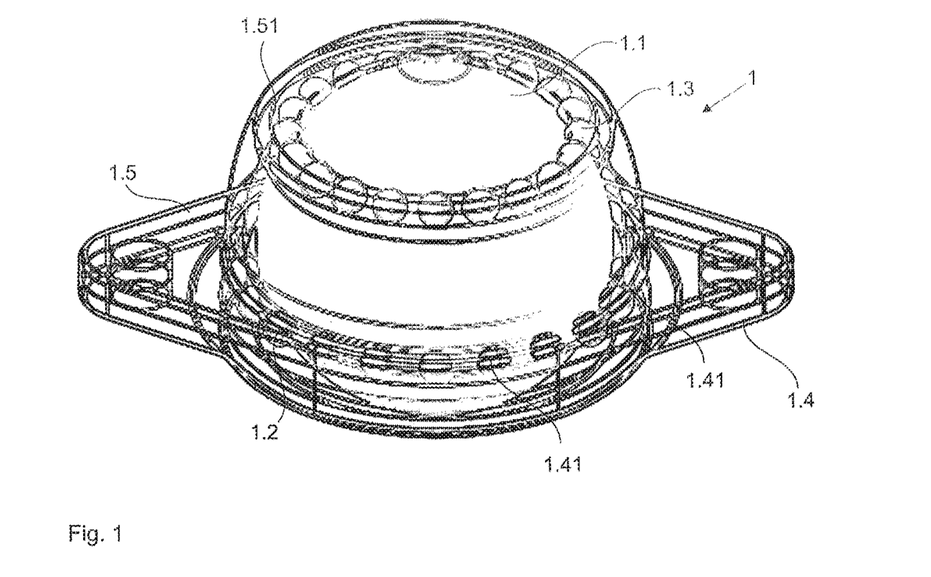
FIG. 1 represents a perspective view of a possible embodiment of the multi-directional rolling ball device (1), showing especially the main rolling ball (1.1), in direct contact with the surface of the device and the surface of the smaller balls (1.21, 1.31), which are within the lower (1.2) and the upper (1.3) rings.
Figure 2:
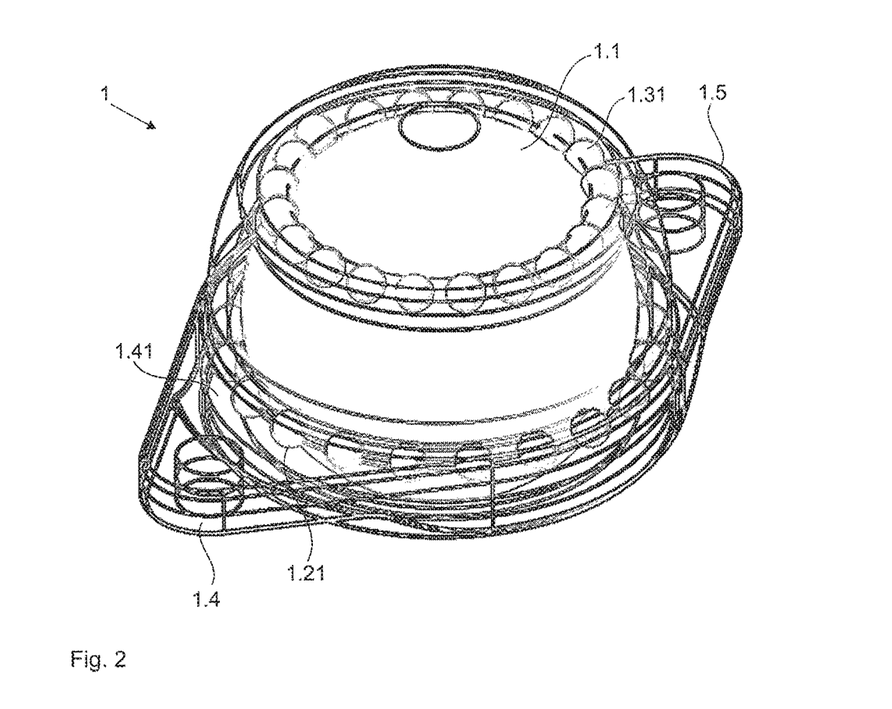
FIG. 2 represents a perspective view of a possible embodiment of the multi-directional rolling ball device, especially showing lower (1.2) and upper (13) rings of balls.

FIGS. 1 and 2 illustrate an embodiment wherein the multi-directional rolling device (1 comprises a housing formed by a lower structural member (1.4) and an upper structural member (1.5), which enclose a main rolling ball (1.1). Each one of the lower and upper structural members (1.4, 1.5) has, at its internal surface, at least one groove (1.41, 1.51) to receive lower and upper secondary rolling balls (1.2, 1.3).

Figure 3A:
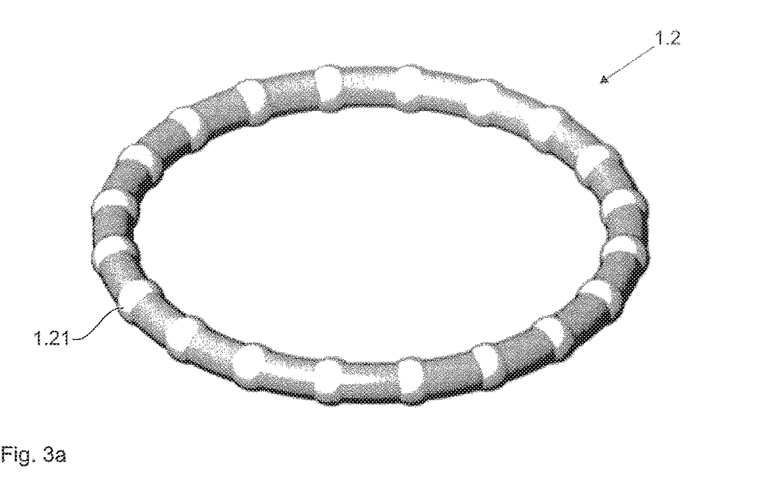
FIGS. 3a and 3b show, in detail, the lower (1.2) and the upper (1,3) rings of smaller balls (1.21, 1.31) in a possible embodiment of the device. Such rings of balls are the rolling rings responsible for the contact between the main rolling ball (1.1) and the inner wall of the device, thereby enabling a rolling of 360°, in all axes.
Figure 3B:
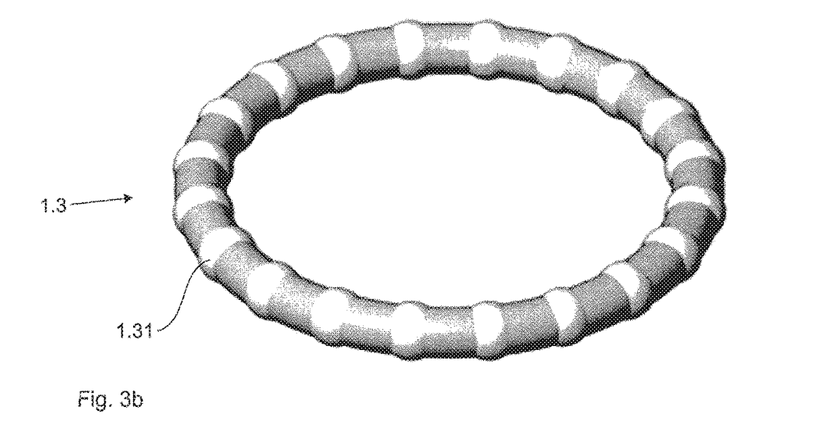
Figure 4:
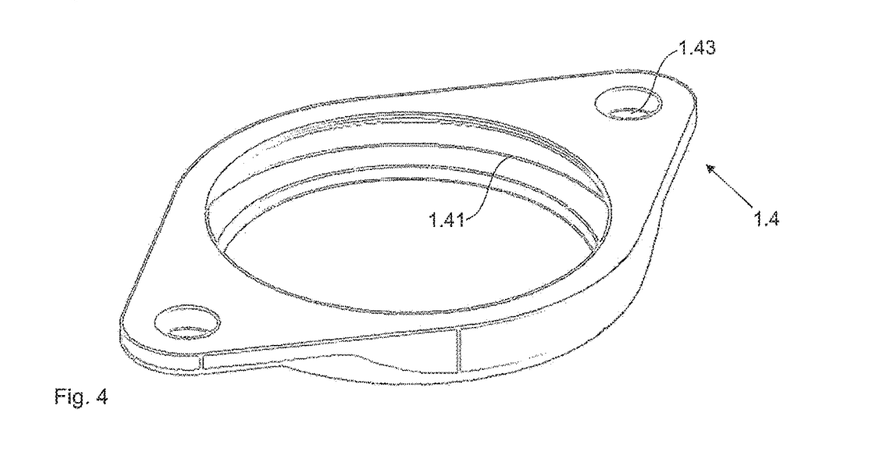
FIG. 4 specifically illustrates the lower structural member (1.4) of the housing, in a possible embodiment wherein the housing is formed by more than one piece. Such structural member consists of a lower part (base), having the purpose of arranging both the main rolling ball (1.1) and the lower ring of rolling balls (1.2) consisting of smaller balls (1.21).
Figure 5:
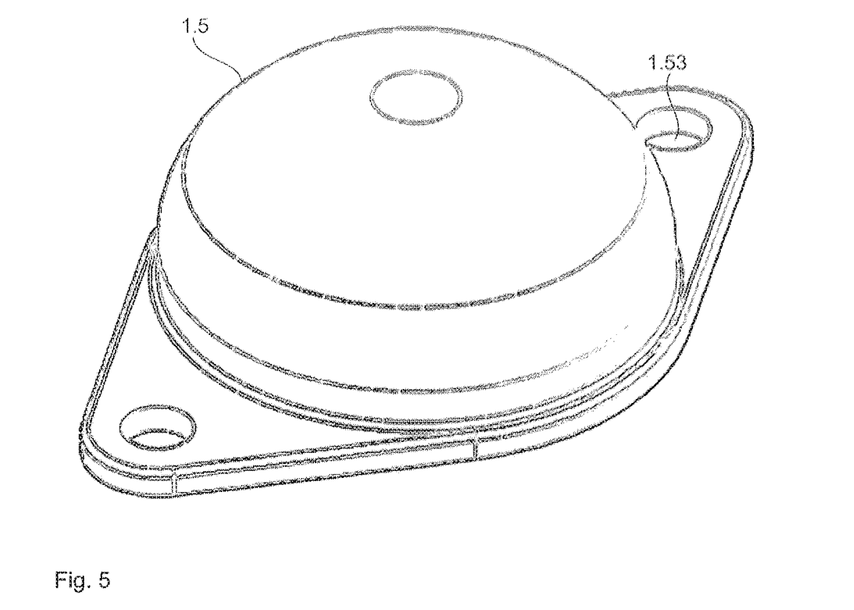
FIG. 5 specifically illustrates the upper structural member (1.5) of the housing, in a possible embodiment wherein the housing is formed by more than one piece. Such structural member consists of an upper part having the purpose of arranging the upper ring of rolling balls (1.3), working as an indirect support for the main rolling ball (1.1).
Figure 6:
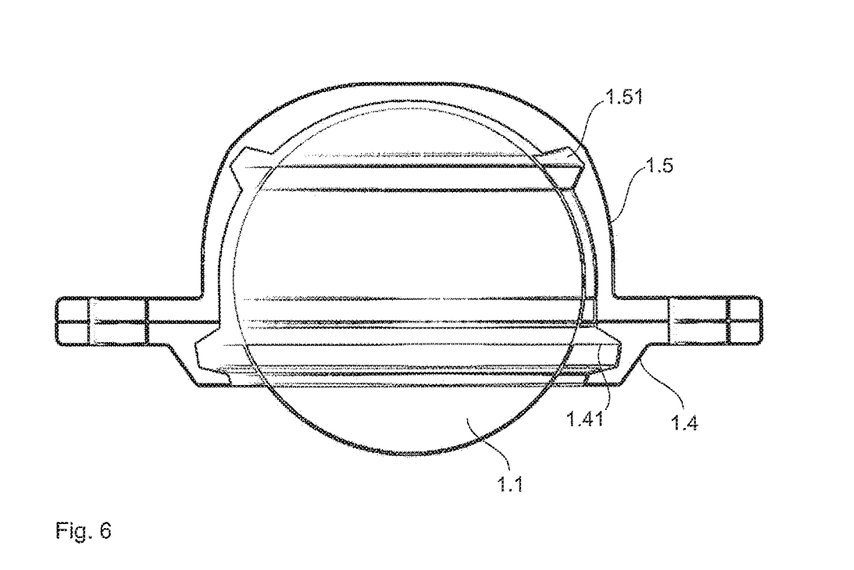
FIG. 6 is a front view of a possible embodiment of the multi-directional rolling ball device (1), showing its interior details, and especially the grooves (1.41, 1.51) of the lower and upper structural members (1.4, 1.5), respectively, which receive the rings (1.2, 1.3).

FIG. 3 illustrates an embodiment wherein lower and upper rings (1.2, 1.3), respectively, composed of secondary rolling balls (1.21, 1.31). Each one of these rings has to be fitted to at least one groove (1.41, 1.51) of its respective structural member (1.4, 1.5), as shown in FIGS. 4, 5 and 6.

Figure 11:
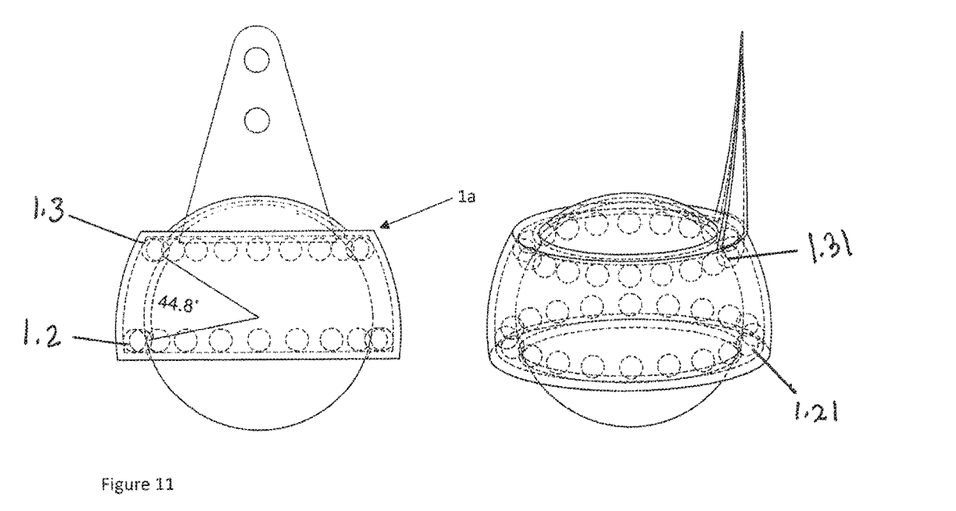
FIGS. 11 and 12 illustrate other possible embodiments of the device disclosed herein, wherein the housing (1a) of the device is formed by a single piece (FIG. 11), and by a lower (1.4) and upper (1.5) structural members attached by clamping means (C) shown in FIG. 12.
Figure 12:
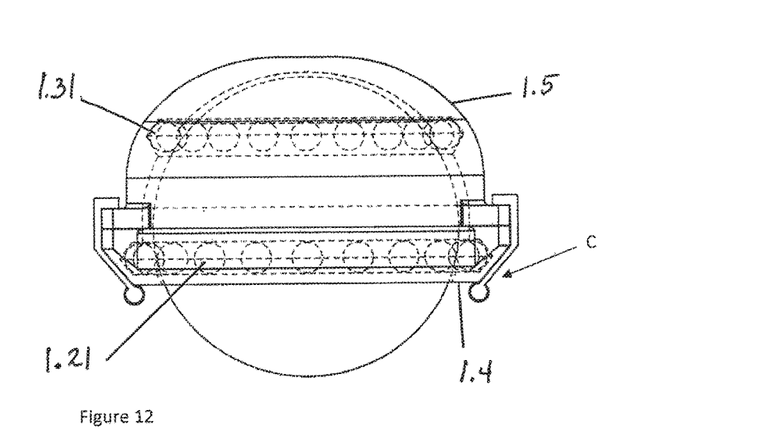

FIG. 11 illustrate an embodiment wherein the housing is formed by a single piece, or structural member, in which embodiment there is no need for attaching upper and lower structural members, making the whole structure more compact. FIG. 12 shows a housing formed by lower structural members and an upper structural member attached by clamping means instead of pins, screws or bolts. It can be understood that other attaching means, such as simple fitting in, may also be employed with the same efficacy, without the need for screws, bolts or the like.

The angular distance between the rings of secondary rolling balls may be less than 50°. The illustrative example of FIG. 11 depicts an angular distance between the rings of secondary rolling balls 1.2, 1.3 of less than 50° and further less than 45°. In particular, FIG. 11 depicts an angular distance between the rings of secondary rolling balls 1.2, 1.3 of about 44.8°, as is shown.

The rings of secondary rolling balls (1.2, 1.3) are responsible for allowing the rolling at 360° in all axes, thereby making possible the free movement, in all directions, of the load supported by the multi-directional rolling device (1). The secondary rolling balls (1.21, 1.31) have the same size and they are made of the same material. The properties of the material used for making the bearings or rollers, also called secondary rolling balls, determine the extension of the friction that will happen, a key factor that affects the durability thereof. The bearings or rollers, also called secondary rolling balls, are preferably made of a light material having a low friction coefficient, such as tungsten, aluminum, carbon steel alloys and even some non-metallic materials, chosen depending on the intended use.

According to an embodiment of the present utility model, a thin adhesive tape sticks the balls (1.21, 1.31) in a ring shape. The role of the adhesive tape is to maintain the balls together, thereby facilitating the installation. After finishing the installation procedure, the adhesive tape decompose due to the rolling of the device. An example non-limitative of the material that could be used for such a purpose is a vegetable paper. During use, the secondary rolling balls are not held by a ball cage. It is also possible however, that a ball cage is provided, which allows a rotation of the secondary rolling balls around at least two rotational axes which deviate from each other.

As it can be understood from FIGS. 3a, 3b, the rings (1.2, 1.3) may be built by enveloping the secondary rolling balls (1.21, 1.31). The envelopment or wrapping assures that the secondary rolling balls are maintained at a preset position, preventing their displacement when the rings are being inserted into the grooves (1.41, 1.51). When the multi-directional rolling device (1) is used, the envelopment of the rings of secondary rolling balls breaks off and/or decompose due to the friction between the rings of secondary rolling balls (1.21, 1.31) and the main rolling ball (1.1).

The appended FIGS. 1 to 10 clearly show how the claimed device works. In short, the surface of the main rolling ball (1.1) enters into contact with the surfaces of the secondary rolling balls (1.21, 1.31). Accordingly, the rings of secondary rolling balls (1.2, 1.3) execute the contact between the main rolling ball (1.1) and the inner wall of the lower and the upper structural members (1.4, 1.5), respectively. These inner walls might be of a hardened structure. Such rings (1.2, 1.3) are inserted into the respective inner grooves (1.41, 1.51) of the lower and upper structural members (1.4, 1.5).

As it can be better noted in the FIG. 4, the lower structural member (1.4) comprises a groove (1.41) for fixing the lower ring (1.2). Furthermore, the lower structural member (1.4) comprises a central opening (1.42), which diameter is smaller than the diameter of the main rolling ball (1.1), causing the main rolling ball to be positioned on the lower structural member (1.4), thereby allowing the contact of the main rolling ball (1.1) with the surface on which the multi-directional rolling device will slide. The opening (1.42) having a diameter smaller than the diameter of the main rolling ball (1.1) further prevents the main rolling ball from being totally inserted within the multi-directional rolling device (1).

As it can be better noted from FIG. 5, the upper structural member (1.5) comprises a groove (1.51) to fit the upper ring (1.3). Moreover, it has a chamber (1.52) which encompasses the main rolling ball 1.1, making possible the contact of the main rolling ball (1.1) with the surface on which the multi-directional rolling device will enter into contact.

The grooves (1.41, 1.51), that respectively receive the rings (1.2, 1.3), are clearly shown in FIG. 6.

Figure 7A:
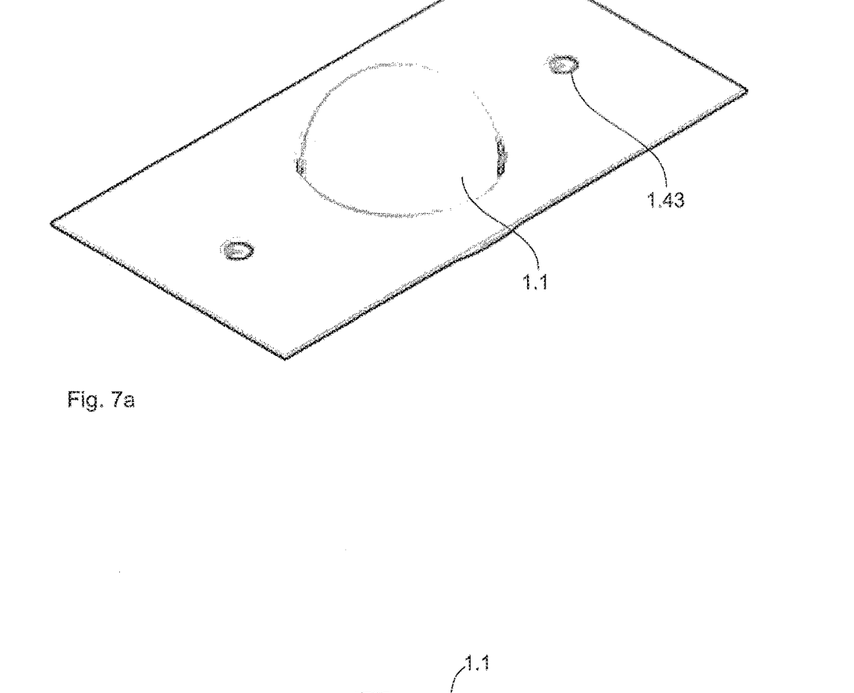
FIGS. 7a and 7b illustrate, in one of the possible embodiments, the fitting of the set comprising the lower structural member (1.4) coupled with the lower ring of rolling balls (1.2) and with the main rolling ball (1.1), which is inserted into a central opening (1.42), the set being used in an object to which the multi-directional rolling ball device (1) is to be fitted.
Figure 7B:
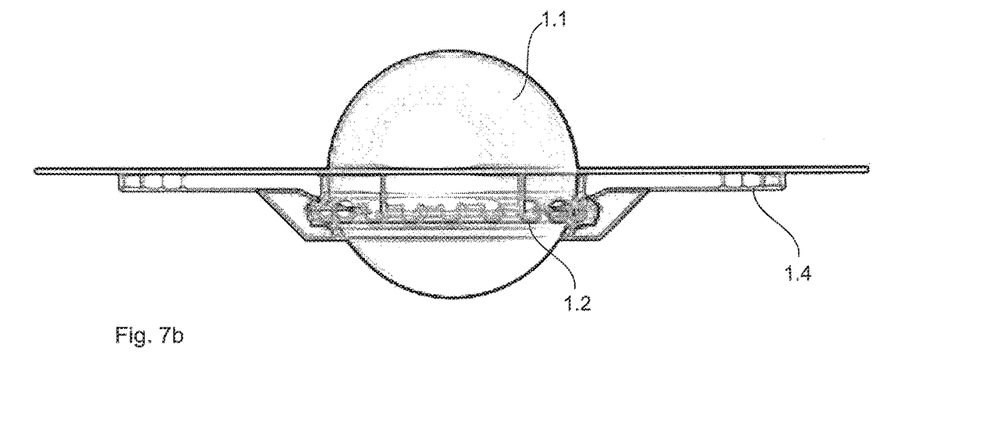

From FIGS. 7a and 7b, it can also be noted a non-limitative example of the coupling between the structural members (1.4, 1.5) of the multi-directional rolling device (1), and the coupling thereof with the object to which it will be fitted. The coupling can be performed, for instance, by fitting, riveting, screwing or gluing.

The upper structural member (1.5) can be connected to the lower structural member (1.4) by means of fitting means or else by screwing/riveting, using the existing holes (1.43, 1.53) The lower and upper structural members (1.4, 1.5), therefore, work as an indirect support to receive the main rolling ball (1.1).

The objects to which the multi-directional rolling device (1) can be fitted are, in general, for example, furniture, such as chairs and tables, baby strollers or baby prams, supermarket trolleys, and toys, as well as luggage cases, bags, backpacks and the like. After being fixed, the lower structural member (1.4) receives the ring of secondary rolling balls (1.2), which is placed in the at least one inner groove (1.42). Afterwards, the main rolling ball (1.1) is arranged within the lower structural member (1.4), and it will be in contact with the ring of secondary rolling balls (1.2). Subsequently, as it can be seen in FIG. 8, the installation of the upper structural member (1.5) is performed. The main rolling ball (1.1) is arranged in the chamber (1.52), enclosing, consequently, the multi-directional rolling device (1). The main rolling ball (1.1), when enclosed, contacts both rings of secondary rolling balls (1.2, 1.3).

Figure 8:
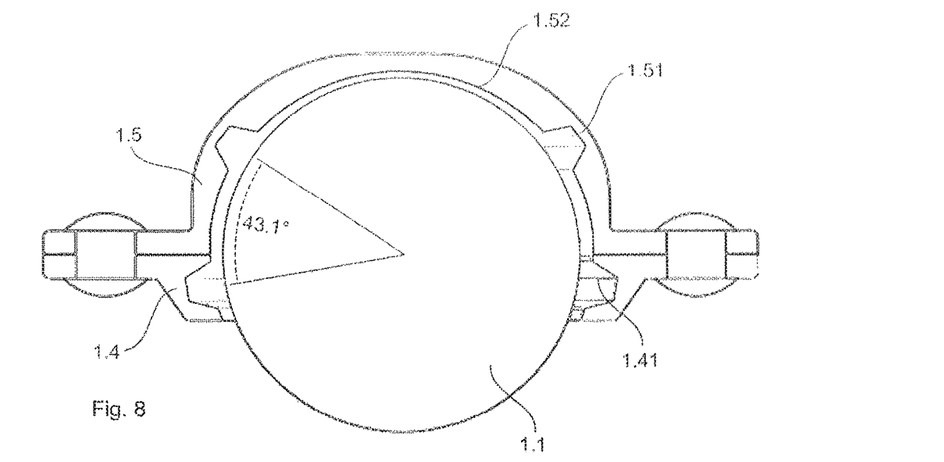

FIG. 8 illustrates how is the interaction between the main rolling ball (1.1) and the other parts, which comprises the structure of the present device.

It should be noted that the distance between the surface of the object in which the multi-directional rolling device is to be used and the base of the rolling device has to be designed so as to minimize the whole size of all members to be used for manufacturing the device, as well as to allow more suitable angles during the use of the object to which the multi-directional rolling device (1) is to be fitted.

For example, when a multi-directional rolling device (1) is fitted to a luggage case, the device has to enable the object to tilt without adversely changing its performance. Accordingly, the smaller the slope angle of the rolling device is, the larger the gap between the device and the edge of the object to which the device is fitted must be.

Concerning the angular slope level, or inclination angle, between the central vertical axis of the device and the surface upon which the main rolling ball rolls, a skilled person knows that the smaller, or more acute, such angle is, the more an object attached thereto will be allowed to slope without having friction of the housing with the ground. According to an embodiment of the present patent application, the position of the rings of secondary rolling balls (1.2, 1.3) provides a smaller angular slope, or more acute inclination angle, e.g. 50°, as shown in FIG. 9b.

By means of example, each multi-directional rolling device (1), designed according to the present utility model, is able to support loads of up to 80 kg, or even greater without causing any locking of the rolling device system.

Figure 9A:
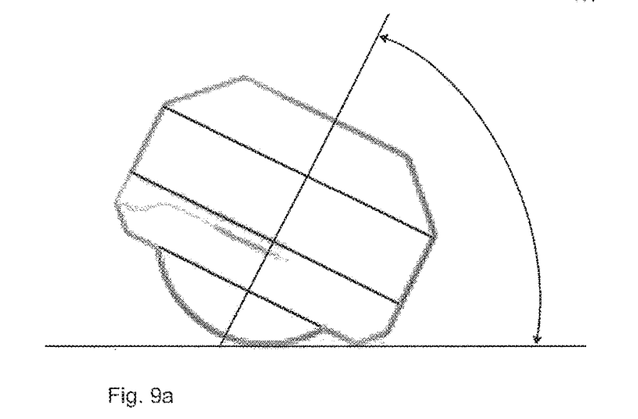
FIGS. 9a and 9b show two perspective views of different multi-directional ball caster-type systems, one representing the state-of-art and the other one representing a possible embodiment of the device described herein. The different movement of the rolling ball device of the present utility model shows the advantage of having a higher slope caused by the improvements of the rolling ball device as herein disclosed and claimed in relation to other devices of the prior art. The rolling ball device shown in FIG. 9a is an example of the device of the state of the art, wherein the maximum slope angle is of 62°. Differently, from the rolling ball device of FIG. 9b, it can be noted that the novel arrangement and the new shape of the rolling ball device disclosed herein enables a slope, or inclination angle, of 50°. More acute inclination angles may be enabled by decreasing the distance between the rings of secondary rolling balls.
Figure 9B:
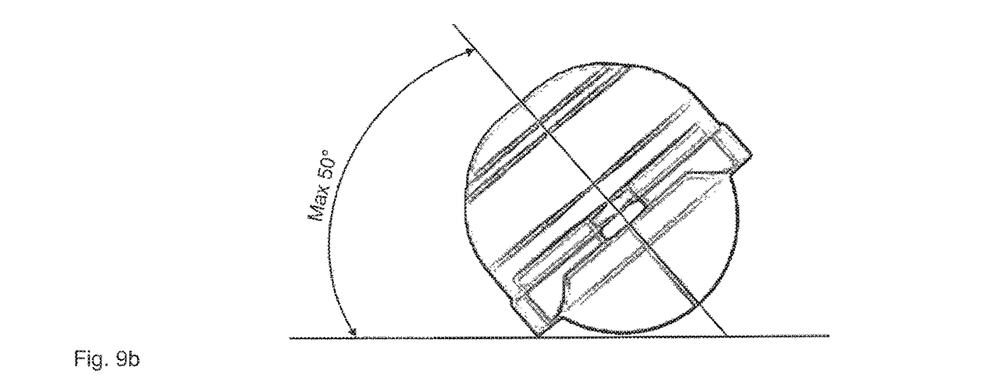
Figure 10A:
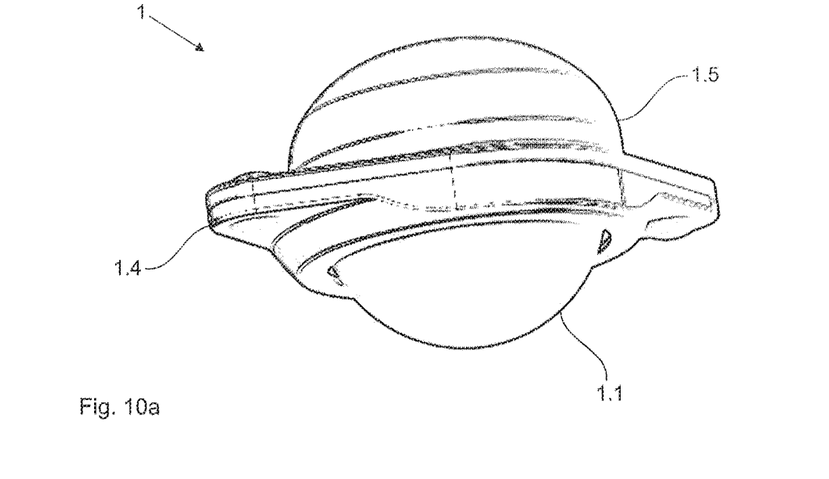
FIGS. 10a and 10b are bottom and top perspective views, respectively, of the multi-directional rolling ball device (1) as mounted.
Figure 10B:
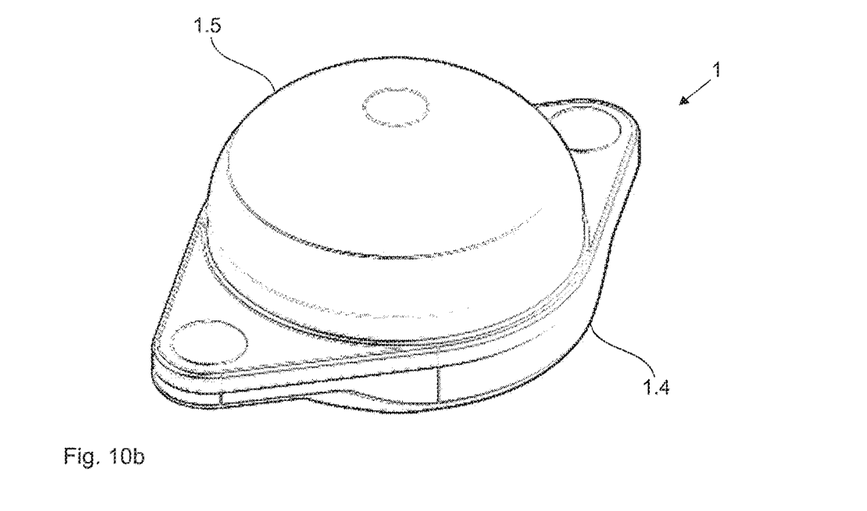

The multi-directional rolling device (1) has particularities which allow that it can be distinguished from the other devices shown in the prior art, and further it exhibits a number of other advantages, such as its system of balls, or bearings/rollers, arranged in a functional and safe way to the lower and upper structural members (1.4, 1.5), the innovative position of the rings of secondary rolling balls (1.2, 1.3) relative to the main ball rolling (1.1), making possible a slope angle, or inclination angle, of at least 62°, but also less than 60°, or even less than 50° between the main rolling ball (1.1) and the ground in relation to the object to which the device is fitted to, as exemplified in FIG. 9. It should be noted that all embodiments described herein and illustrated in the examples shown in the figures have the slope angle between 62° and 50°, but it is clear that more acute slope angles, or inclination angles, may be allowed by rearranging the housing and the distance between the rings of secondary rolling balls, depending on the intended use of the device.

For example, if the device is intended for a use in which it will be required to be constantly inclined, the distance between the rings or secondary rolling balls may be reduced. Moreover, if more than 2 rings of rolling balls are required, due to operational reasons, 3 or more rings of secondary rolling balls may be used. In this case, the distance between the upper and lower rings is preferably up to 50°.

Moreover, after making many computer simulations and assessments, the inventor has verified the functional advantages of the claimed rolling device (1) compared with other similar devices already available. Some of the advantages are as follows:

Smaller angular slope level between the central vertical axis of the device and the surface upon which it rolls. As described herein, the angular slope level may also be interpreted as the inclination angle between the central vertical axis of the device and the surface upon which it rolls. The central vertical axis of the device is the central vertical axis of the main rolling ball, so when the slope, or inclination, is zero, the angular slope level, or inclination angle is 90°. Accordingly, when the object is inclined, or sloped, such angle is acute, i.e. less than 90°. The angular slope, or inclination angle, of the device disclosed herein is 62° or less, preferably 50°, as shown in FIG. 9b.

This advantage is, mainly, due to the innovative position of the center of the main rolling ball (1.1), which was taken away from the base of the lower structural member (1.4), thereby considerably increasing the maximum slope (i.e. decreasing the angular slope, or inclination angle) of the device without having friction with the ground, or any surface upon which the main ball of the device rolls. Moreover, changes in the dimensions or sizes of the housing and/or lower structural member (1.4) and the innovative position of the rings (1.2, 1.3), which are spaced by at least 50°, also allow an increased slope, or inclination, of the object.

Design and arrangement may include having an optimized sizing. The changes make possible structural improvements, as well as a considerable reduction of the weight of the device.

These advantages were attained because of the modification on the upper structural member (1.5), particularly the removal of sharp corners or edges, which makes possible a better distribution of forces throughout the structure, and further the elimination of possible damage to the surfaces where the device is installed. The total length of the device was reduced, however, the height of the device was increased to optimize its mechanical efficiency. Obviously, the device, as well as its respective parts, can have varied sizes depending on the different uses, maintaining the same dimensional proportions.

Fewer parts and simplicity of the members, and therefore, a lower maintenance cost, a lower assembly cost, a greater flexibility concerning the suppliers and an easy maintenance due to the use of the same parts for multiple purposes.

It is clearly understood that different types of materials can be used for manufacturing different parts of the device, depending on the different uses, the loads that the device must support, and the type of the ground (surfaces) where the objects will slide.

Additionally, according to the present utility model, there is disclosed a method for fitting the parts of the multi-directional ball caster-type device (1), the method comprising the following steps:

a) inserting a lower ring of secondary rolling balls (1.2) into at least one groove or recessed area (1.41) of the lower structural member (1.4);

b) fixing a set comprising the lower structural member (1.4) and the lower ring of secondary rolling balls (1.2), obtained in step a, to the object in which the device (1) is to be installed;

c) fitting the main rolling ball (1.1) to the structure obtained in step b;

d) inserting an upper ring of secondary rolling balls (1.3) into at least one groove or recessed area (1.51) of the upper structural member (1.5);

e) fixing the set comprising the upper structural member (1.5) and the upper ring of secondary rolling balls (1.3), obtained in step d, to the object in which the device (1) is to be installed, aligning the fixing holes; and f) providing the interlocking of the lower structural member (1.4) and the upper structural member (1.5), fixed to the object in which the device (1) is installed, by means of two fixing elements, such as a rivet-type element.

It must be understood that variations, modifications and changes of the utility model herein disclosed will be apparent to those skilled in this art, and they may be made without departing from the sprit and the scope of the present utility model or its equivalents, as encompassed by the appended claims and their equivalents.

The invention is further described by the following numbered paragraphs:

Multi-directional ball caster-type device (1), comprising
a housing (1a);
at least one lower ring of rolling balls (1.2);
at least one upper ring of rolling balls (1.3); and
a main rolling ball (1.1),
said main rolling ball (1.1), the at least one lower ring of rolling balls (1.2), and the at least one upper ring of rolling balls (1.3) being enclosed by the housing, without the need of any additional element, such as a skirting device or flanges, wherein the at least one lower ring of rolling balls (1.2), and the at least one upper ring of rolling balls (1.3) are spaced from each other by 50° or less, allowing an inclination angle of the housing of 62° or less.

The Multi-directional ball caster-type device (1), wherein the housing has at least a lower and an upper grooves carved in its internal wall, in which said lower ring of rolling balls (1.2) is inserted, and an opening (1.42), which diameter is smaller than the diameter of the main rolling ball (1.1), and through which a portion of said main rolling ball (1.1) contacts a surface. The grooves are spaced from each other by 50° or less, allowing an inclination angle of the housing of 62° or less.

The multi-directional ball caster-type device (1), wherein the housing (1a) is formed by lower and upper structural members (1.4, 1.5).

The multi-directional ball caster-type device (1), wherein it is possible having a slope, or inclination, of the device (1) at an angle of 60°, or less, and preferably 50°, or less.

The multi-directional ball caster-type device (1), according to at least one of the preceding paragraphs, wherein the diameter of said lower and upper rings of secondary rolling balls is smaller than the diameter of the main rolling ball (1.1) and the diameter of said lower ring of secondary balls and a diameter of said upper ring of balls differ from each other, for example, the diameter of said lower ring of secondary balls is greater than a diameter of said upper ring of balls or vice-versa.

The multi-directional ball caster-type device (1), wherein the secondary balls have a distance to each other which is greater than 10% of the diameter of the secondary balls, preferably greater than 20% of the diameter of the secondary balls and most preferably greater than 30% of the diameter of the secondary balls.

The multi-directional ball caster-type device (1), according to at least one of the preceding paragraphs, wherein each one of said secondary rolling balls (1.21, 1.31) of the set of balls has the same size.

The multi-directional ball caster-type device (1) wherein each one of said secondary rolling balls (1.21, 1.31) are made of the same material.

The multi-directional ball caster-type device (1), wherein said main rolling ball (1.1) and/or said secondary rolling balls (1.21, 1.31) are made of a light material having a low friction coefficient, such as, but not limited to a group of materials comprising tungsten, aluminum, carbon steel alloys and even some non-metallic materials, so it does not require lubrication.

The invention claimed is:

1. Multi-directional ball caster-type device for using in luggage cases bags backpacks and the like, characterized in that it comprises:
    a housing;
    at least one lower ring of rolling balls;
    at least one upper ring of rolling balls wherein each one of the rings of rolling balls comprises an enveloped set of secondary rolling balls and further comprising a thin tape that immobilizes said secondary rolling balls during installation, wherein the tape is configured to break during use of the roller; and
    a main rolling ball,
    said main rolling ball, the at least one lower ring of rolling balls, and the at least one upper ring of rolling balls being enclosed by the housing, wherein the housing is formed by a lower structural member and an upper structural member, wherein the lower structural member comprises at least one lower groove containing said lower ring of rolling balls inserted therein, and an opening, which diameter is smaller than the diameter of the main rolling ball, and through which a portion of said main rolling ball contacts the ground; said upper structural member has at least one upper groove containing said upper ring of rolling balls inserted therein, and a chamber in which the main rolling ball is arranged, the at least one lower ring of rolling balls, and the at least one upper ring of rolling balls are spaced from each other by 50 degrees or less with respect to an angle measured between a first line extending from a centerpoint of a first secondary rolling ball to a centerpoint of the main rolling ball and a second line extending from a centerpoint of a second secondary rolling ball to the centerpoint of the main rolling ball, wherein the centerpoints of the first and second secondary rolling balls sit on a plane with the centerpoint of the main rolling ball allowing an inclination angle of the housing of 62 degrees or less with respect to the ground.

2. Multi-directional ball caster-type device, according to claim 1, wherein the at least one lower groove and the at least one upper groove are carved in an internal wall of the housing.

3. Multi-directional ball caster-type device, according to at least one of the preceding claims, characterized in that it is possible to have a slope of the device at an angle of 60 degrees, or less, and preferably 50 degrees, or less with respect to the ground.

4. Multi-directional ball caster-type device, according to claim 1, characterized in that said main rolling ball and/or said secondary rolling balls are made of a light material having a low friction coefficient.

\* \* \* \* \*